US012542336B2

(12) United States Patent
Tong et al.

(10) Patent No.: US 12,542,336 B2
(45) Date of Patent: Feb. 3, 2026

(54) MANUFACTURING METHOD OF POUCH BATTERY

(71) Applicant: GUANGDONG MIC-POWER NEW ENERGY CO., LTD., Huizhou (CN)

(72) Inventors: Yan Tong, Huizhou (CN); Zhiyong Chen, Huizhou (CN)

(73) Assignee: GUANGDONG MIC-POWER NEW ENERGY CO., LTD., Guangdong (CN)

(*) Notice: Subject to any disclaimer, the term of this patent is extended or adjusted under 35 U.S.C. 154(b) by 741 days.

(21) Appl. No.: 17/789,986

(22) PCT Filed: Jul. 17, 2020

(86) PCT No.: PCT/CN2020/102568
§ 371 (c)(1),
(2) Date: Jun. 29, 2022

(87) PCT Pub. No.: WO2021/135164
PCT Pub. Date: Jul. 8, 2021

(65) Prior Publication Data
US 2022/0416377 A1    Dec. 29, 2022

(30) Foreign Application Priority Data
Dec. 30, 2019   (CN) .......................... 201911398224.1

(51) Int. Cl.
*H01M 50/566*   (2021.01)
*B23K 31/02*    (2006.01)
(Continued)

(52) U.S. Cl.
CPC .......... *H01M 50/566* (2021.01); *B23K 31/02* (2013.01); *H01M 10/058* (2013.01);
(Continued)

(58) Field of Classification Search
CPC .. B23K 31/02; H01M 10/058; H01M 50/105; H01M 50/178; H01M 50/531
See application file for complete search history.

(56) References Cited

U.S. PATENT DOCUMENTS 9,786,886 B2 * 10/2017 Sakaguchi .......... H01M 50/463
11,811,077 B2 * 11/2023 Wu ..................... H01M 50/124
2022/0416377 A1 * 12/2022 Tong ................... H01M 10/058

FOREIGN PATENT DOCUMENTS

CN    202423483 U    9/2012
CN    108091780 A    5/2018
(Continued)

*Primary Examiner* — Minh N Trinh
(74) *Attorney, Agent, or Firm* — SALIWANCHIK, LLOYD & EISENSCHENK

(57) ABSTRACT

Disclosed is a manufacturing method of a pouch battery. The manufacturing method includes forming a cavity in a shell and forming a through hole on the shell; forming a terminal in the cavity connected to the through hole in a sealed manner; placing an energy conversion element and an electrical connector connected to the energy conversion element into the cavity; connecting the electrical connector to the terminal in the cavity by providing a welding pin outside of the shell during welding; forming a liquid injection port; injecting electrolyte into the cavity via the liquid injection port; sealing the liquid injection port by performing a first sealing; and activating the electrolyte. After activation, the method further includes forming an opening at one side of the shell performing the first sealing, vacuumizing the cavity to drain excess electrolyte; and performing a second sealing to seal the shell.

9 Claims, 4 Drawing Sheets

(51) Int. Cl.
 *H01M 10/058* (2010.01)
 *H01M 50/105* (2021.01)
 *H01M 50/178* (2021.01)
 *H01M 50/627* (2021.01)

(52) U.S. Cl.
 CPC ....... *H01M 50/105* (2021.01); *H01M 50/178* (2021.01); *H01M 50/627* (2021.01)

(56) References Cited

FOREIGN PATENT DOCUMENTS

| | | | |
|---|---|---|---|
| CN | 111009625 | A | 4/2020 |
| CN | 111129365 | A | 5/2020 |
| CN | 111129388 | A | 5/2020 |
| CN | 111129417 | A | 5/2020 |
| CN | 111129564 | A | 5/2020 |
| JP | 2008016368 | A | 1/2008 |
| JP | 6626557 | B1 | 12/2019 |

* cited by examiner

MANUFACTURING METHOD OF POUCH BATTERY

CROSS REFERENCE TO RELATED APPLICATIONS

This application is a National Stage of International Application No. PCT/CN2020/102568, filed on Jul. 17, 2020, which claims priority to Chinese Patent Application No. 201911398224.1, filed on Dec. 30, 2019, both of which are hereby incorporated by reference in their entireties.

TECHNICAL FIELD

The present disclosure relates to the field of battery technologies, and particularly, relates to a manufacturing method of a pouch battery.

BACKGROUND

A pouch battery usually includes a bare cell and two half-shells that snap together, with the bare cell assembled into a space enclosed by the two half-shells. The bare cell has two tabs protruding outward from edges of the two half-shells. The two half-shells are insulated from each other. For example, the half shells are aluminum-plastic films. The tabs are also insulated from the two half-shells. The edges of the two half-shells are joined together by means of thermal compression. The plastic layer on a surface of the aluminum-plastic film is made of a thermoplastic material and obtains viscosity when heated to a set temperature; under the action of external pressure, two edges thereof are bonded together and thus bonded with the tab.

In this solution, the tabs need to be drawn out from the inside to an external terminal, however, welding from inside to outside is not possible during assembly of the battery, otherwise a long metal strip is required to realize welding from inside to outside, which increases complexity of the battery structure, takes up space, and restrains energy density of the battery. Some steel shell battery manufacturers use a process where the tabs are welded and drawn out after the battery is filled with liquid, wherein a passivation layer is corroded because the tabs are soaked in the electrolyte, resulting in a welding with poor consistency of the tab of the battery. If a soaking time is inconsistent, welding power parameters are also inconsistent, making it impossible to determine welding process parameters. In a worst case scenario, a thick passivation film is formed on the surfaces of the tabs, which makes it impossible to weld. If the welding power is increased, it will easily lead to explosive welding which causes metal dust impurities and thus internal short circuit of the battery which seriously impacts on safety performance thereof. In addition, fusion splice of the weld metal leads to decomposition of the electrolyte and thus an impact on the performance of the battery.

Therefore, there is a need for a new technical solution to solve at least one of the above technical problems.

SUMMARY

An object of the present disclosure is to provide a new technical solution for a manufacturing method of a pouch battery.

According to a first aspect of the present disclosure, a manufacturing method of a pouch battery is provided. The pouch battery includes a shell and an energy conversion element, the energy conversion element being provided with an electrical connector protruding outward therefrom, the shell forming a closed cavity therein and being provided with a through hole; and the pouch battery further includes a terminal connected to the through hole in a sealed manner; the manufacturing method comprises: placing the energy conversion element into the cavity; connecting the electrical connector to the terminal by welding; injecting electrolyte into the cavity and sealing the cavity; and activating the pouch battery.

Optionally, the manufacturing method further includes, after activation: vacuumizing the cavity; and sealing the shell.

Optionally, energy is applied from an outer side of the terminal during welding.

Optionally, during welding, a welding spot or welding bead passes through the terminal from an outer side of the shell; or the welding spot or welding bead gradually spreads around from a contact surface between the terminal and the electrical connector.

Optionally, the shell includes a first half-shell and a second half-shell which are connected together in a sealed manner, at least one of the first half-shell and the second half-shell including a recessed structure and an edge portion formed as an outward peripheral extension of an edge of the recessed structure, the edge portion being configured for a sealed connection, the recessed structure being provided thereon with the terminal and constituting at least a part of the cavity.

Optionally, each of the first half-shell and the second half-shell includes the recessed structure and the edge portion, the recessed structure of the first half-shell and that of the second half-shell are arranged opposite to each other and together form the cavity.

Optionally, the cavity is in the shape of a cuboid, edge portions of three sides of the cuboid are sealed after the energy conversion element is placed in the cavity, outer sides of two opposite edge portions of the other side are both connected to extension portions, and sides of the two extension portions along their extension directions are connected in a sealed manner and form a liquid injection port for electrolyte injection.

Optionally, a connecting portion between the extension portion and the edge portion is sealed.

Optionally, the shell is formed by punch forming.

Optionally, a thermoplastic material is provided at an edge of one surface of the terminal and is connected to the shell by heat pressing.

Optionally, a heat insulating member is provided between the electrical connector and the energy conversion element.

According to an embodiment of the present disclosure, it is not necessary to lead the electrical connector of the energy conversion element of the pouch battery out of the shell, which avoids the electrical connector being separated from the energy conversion element due to external force.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part thereof, illustrate embodiments of the present disclosure and, together with the description thereof, serve to explain the principles of the present disclosure.

DETAILED DESCRIPTION

Figure 1:
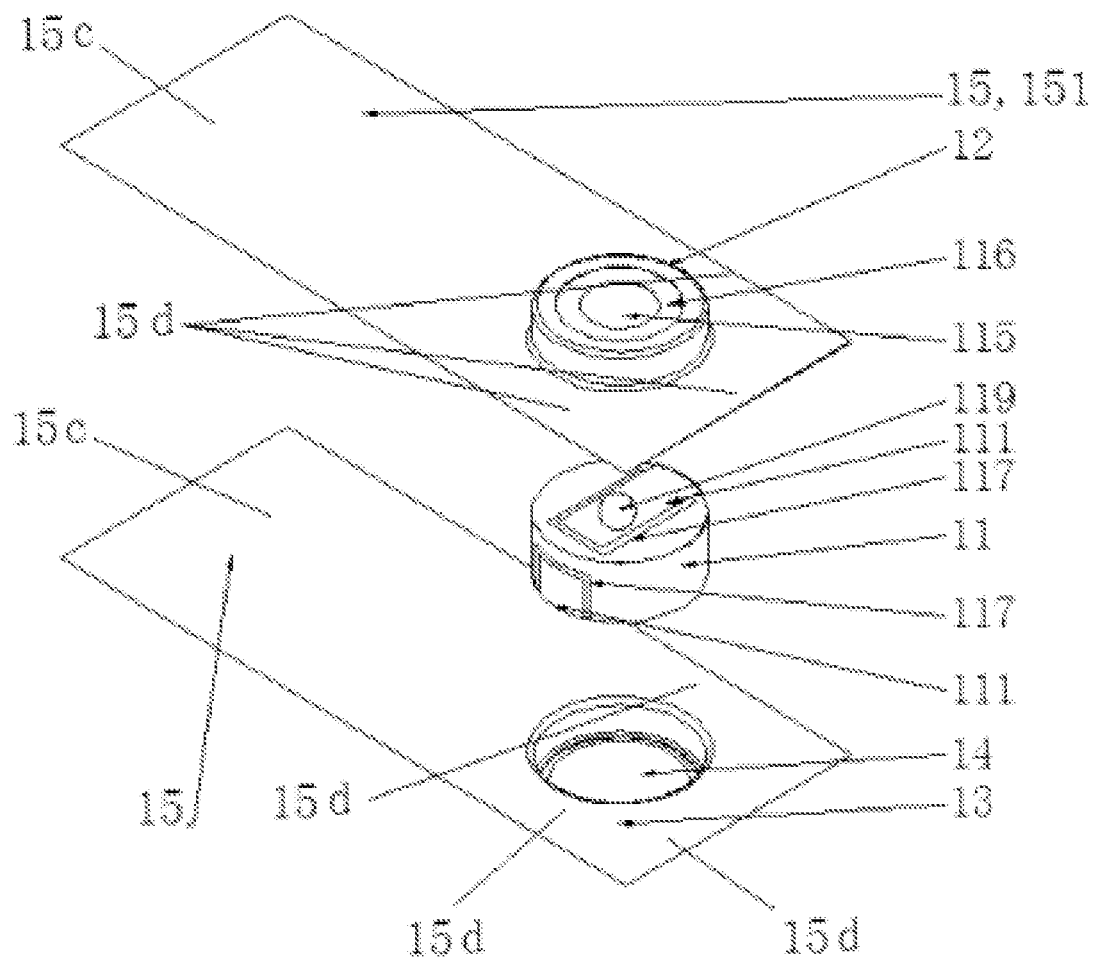
FIG. 1 is an exploded view of a pouch battery during assembly according to an embodiment of the present disclosure.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

According to an embodiment of the present disclosure, a manufacturing method of a pouch battery is provided. As shown in FIG. 1, the pouch battery comprises a shell and an energy conversion element.

The energy conversion element is in a block-like structure, and is provided with an electrical connector extending outwardly therefrom. For example, the energy conversion element is a bare cell 11, such as a lithium-ion bare cell 11. The bare cell 11 is in a cuboid structure, a cylindrical structure, an elliptical cylinder structure, and the like. For example, the outer side of the bare cell 11 is covered with an insulating film which can prevent short circuit between the bare cell 11 and the shell. An electrical connector is connected to at least one surface of the energy conversion element, extends outward from the block-like structure and is connected to an electrode of the energy conversion element. For example, the electrical connector is a tab 111 which may be a nickel sheet or the like. Alternatively, the electrical connector is an empty foil area of the electrodes (positive and negative electrodes, for instance) of the bare cell 11. The empty foil area is a part of the electrode that is not covered with electrode active material. The electrical connector is in parallel with a leading-out terminal plane of the bare cell 11.

The shell forms therein a closed cavity. A through hole 121 is provided on the shell. The pouch battery also includes a terminal 115 that is hermetically connected to the through hole 121. The shell is in a cuboid structure, a cylindrical structure, an elliptical cylinder structure, and the like. The terminal 115 is for conduction between the energy conversion element and an external circuit. For example, the terminal 115 is in a sheet-like structure, is made of metal, and is connected to the electrical connector.

For example, the shell includes at least one half-shell, and the half-shell includes a recessed structure 14 and an edge portion 15 extending outward from the recessed structure 14. The recessed structure 14 is used for accommodating the bare cell 11 and constitutes at least a part of the cavity. The edge portion 15 is used to form a sealed connection. The terminal 115 is provided on the recessed structure 14. The edge portion 15 forms a sealed connection by means of bonding, heat fusion, welding or the like.

The shell is a metal plastic film, such as aluminum plastic film, rigid plastic film, etc. The terminal 115 is made of metal, for example, the terminal 115 is an aluminum sheet, a stainless-steel sheet, a copper sheet, or the like. The terminal 115 is connected to the shell by means of hot fusion connection, ultrasonic welding and the like.

Alternatively, the terminal 115 may be provided with a thermoplastic material ring 116, which is directly connected to the shell during heat fusion.

Alternatively, the shell is a metal plastic film, such as an aluminum plastic film, a rigid plastic film, and the like. The terminal 115 is integrated with the shell. A metal layer is exposed by removing the plastic film layer at a predetermined position of the shell. The exposed metal layer is the terminal 115. In this example, the through hole 121 is directly blocked by the terminal 115.

For example, by punch forming, the recessed structure 14 can be formed, and the through hole 121 that communicates the recessed structure 14 with the external space can be formed.

In one example, the recessed structure 14 is sealed by a sheet-like cover. The cover is in sealed connection with the edge 15. Alternatively, the shell includes two half-shells. The recessed structures 14 of the two half-shells are disposed opposite to each other, and the two edge portions 15 form a sealed connection.

The Manufacturing Method Includes:

placing the energy conversion element into the cavity. For example, the bare cell 11 is placed into the recessed structure 14.

connecting the electrical connector to the terminal 115 by welding. During welding, energy is applied from an outer side of the terminal. That is, energy of a solder pin passes through the terminal 115 from one side of the terminal 115 away from the cavity and then reaches the other side of the terminal 115 close to the cavity. Compared with the method in which energy is introduced from the outer side to the inner side of the electrical connector, this welding method does not need to reserve a working space for welding before enclosure of the shell, and thus reduces the difficulty of assembly.

Figure 5:
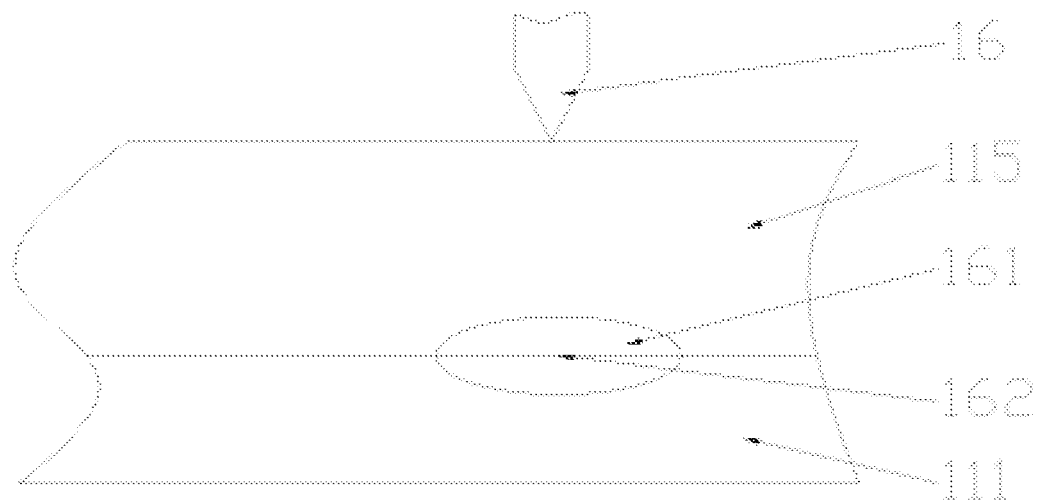
FIGS. 5 and 6 are schematic diagrams of a welding method according to an embodiment of the present disclosure.
Figure 6:
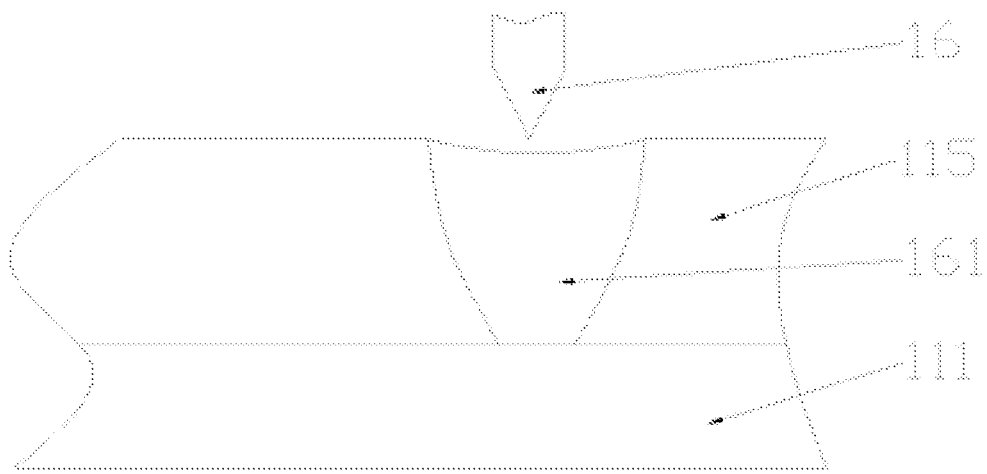

As shown in FIGS. 5 and 6, during welding, a welding spot 161 or welding bead passes through the terminal 115 from the outside of the shell. During welding, a welding pin 16 is located on the outside of the shell rather than on the side of the recessed structure 14. In this way, the shell does not need to leave room for welding. For example, welding may be performed by means of laser welding. The welding bead or spot 161 gradually diffuses inward from the outer surface of the terminal 115 to the electrical connector, and then the terminal 115 and the electrical connector are melt and joined together.

Alternatively, the welding spot 161 or the welding bead gradually spreads around from a contact surface 162 between the terminal 115 and the electrical connector. In this example, resistance welding is employed. The welding pin 16 is also located on the outside of the shell. The welding pin 16 abuts against the terminal 115. During welding, the current reaches the contact surface 162. Since there is a gap between the terminal 115 and the electrical connector at the contact surface 162, a resistance can be formed. Under the action of the current, the contact surface 162 gradually melts, and then the terminal 115 and the electrical connector are connected together. During resistance welding, the current forms a loop.

The above two welding methods can both form effectively connection between the terminal 115 and the electrical connector.

In one example, the shells include a first half-shell 12 and a second half-shell 13. Both the first half-shell 12 and the second half-shell 13 include the recessed structure 14 and the edge portion 15. The recessed structure 14 of the first half-shell 12 and the recessed structure 14 of the second half-shell 13 are disposed opposite to each other, and together form the cavity.

During assembly, the two recessed structures 14 are opposed to each other. The edge portions 15 of the first half-shell 12 and the second half-shell 13 are attached together. For example, the edge portion 15 is provided with a thermoplastic material which connects the edge portions 15 of the first half-shell 12 and the second half-shell 13 together by hot pressing. The thermoplastic material may be an integral part of the first half-shell 12 and the second half-shell 13, or may be a material additionally provided for connection. For example, the first half-shell 12 and the second half-shell 13 are both metal plastic films, such as aluminum plastic films, steel plastic films and the like. The plastic material on the metal plastic film can form a sealed connection by means of hot pressing. Alternatively, the edge of one surface of the terminal 115 is provided with a thermoplastic material, which is connected to the shell by means of hot pressing.

Alternatively, the edge portions 15 of the two half-shells are connected together by welding. For example, during welding, the thermoplastic material at the edge portion 15 melts and bonds together.

Alternatively, the first half-shell 12 and the second half-shell 13 are plastics, such as polyetherketone (PEK), polyetheretherketone (PEEK), polypropylene (PP), and the like. The above-mentioned materials are thermoplastic materials themselves and can be connected by hot pressing.

The edge portions 15 of the two half-shells can also be connected together by means of laser welding and ultrasonic welding. In the case of laser welding, both insulating portions 15 are made of thermoplastic material, such as plastic. There is a color difference between the two insulating portions 15. For example, one of the insulating portions 15 is transparent plastic, and the other insulating portion 15 is colored plastic. The colored plastic may have its inherent color, such as black, red, green, blue, purple, and the like. Alternatively, the colored plastic may be a plastic material coated with colored inks. During laser welding, the laser enters from the side of the clear plastic and reaches the colored plastic. Because the colored plastic can absorb the laser energy and melts quickly, laser welding works better.

For example, during laser welding, the welding bead is provided in multiple turns around the recessed structure 14, which improves sealing and connection performance of the two insulating portions 15.

After welding, electrolyte is injected into inte-the cavity to seal the shell for the first time. For example, the cavity is in the shape of a cuboid. After the energy conversion element is placed in the cavity, the edge portions 15 of three sides (e.g., three short sides 15d) of the cuboid are sealed. Outer sides of two opposite edge portions 15 of the other side are both connected to extension portions 151, and sides of the two extension portions 151 along their extension directions are connected in a sealed manner and form a liquid injection port. For example, the liquid injection port is located at the end of the extension portions 151. The injection port is for electrolyte injection.

First of all, for example, short sides 15d of the edge portions 15 of the two half-shells are sealed. A long side 15c is not completely sealed, so as to form the liquid injection port. For example, edges of the long sides 15c are connected to form a pouch. The pouch is used to contain the gas generated during activation. The electrolyte is a carrier for transporting ions. For example, lithium ions migrate in the electrolyte to charge and discharge the pouch battery.

After the electrolyte is injected, a first sealing of the shell is performed. For example, the electrolyte is injected into the cavity at the liquid injection port. Upon completion of injection, the first sealing is performed to seal the liquid injection port. In one example, the first sealing is performed on the extension portion 151.

Next, the pouch battery is activated. Activation is a common process for pouch batteries and will not be described in detail here.

In an embodiment of the present disclosure, leading the electrical connector of the energy conversion element of the pouch battery out of the shell becomes unnecessary, and avoids separation of electrical connector from the energy conversion element due to external force.

In addition, the terminal 115 is connected to the electrical connector before activation, which allows the activation to be performed more stably.

In addition, the battery is neat in appearance and can be easily assembled into an external device.

In one example, the first seal is opened after activation is complete. For example, the side of the first sealing close to the bare cell 11 is cut to form an opening. Excess electrolyte is drained from the opening. For example, the electrolyte is discharged by vacuumizing the cavity.

After the electrolyte is discharged, a second sealing is performed on the long side 15c so as to seal the shell.

For example, the second sealing is performed at the connecting portion between the extension portion 151 and the edge portion 15. After the second sealing, an excessive part of the extension portion 151 is removed to form the pouch battery, for example, by cutting.

Figure 3:
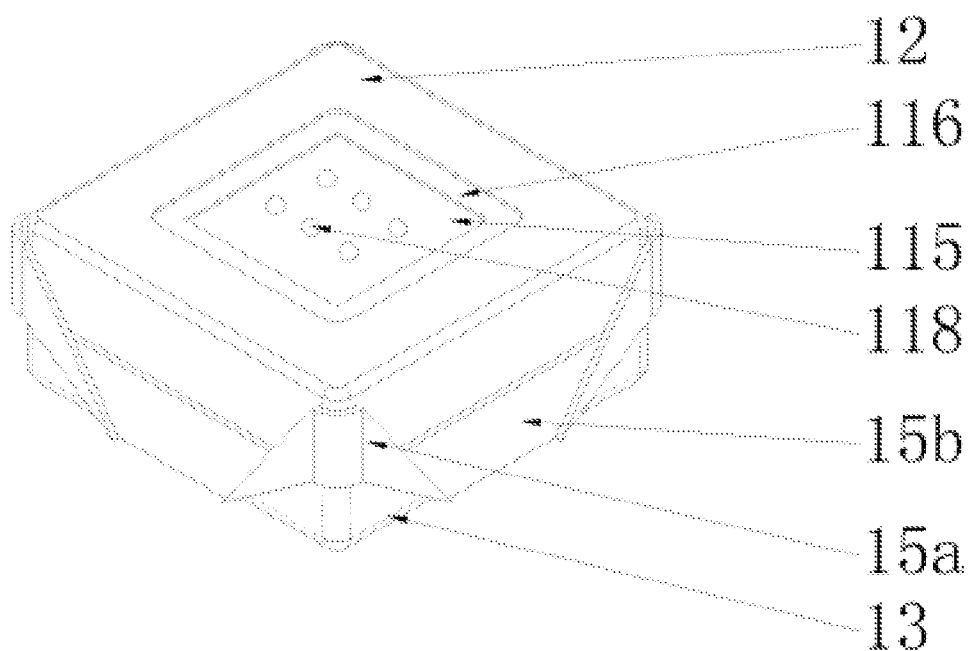
FIG. 3 is a perspective view of another pouch battery according to an embodiment of the present disclosure
Figure 4:
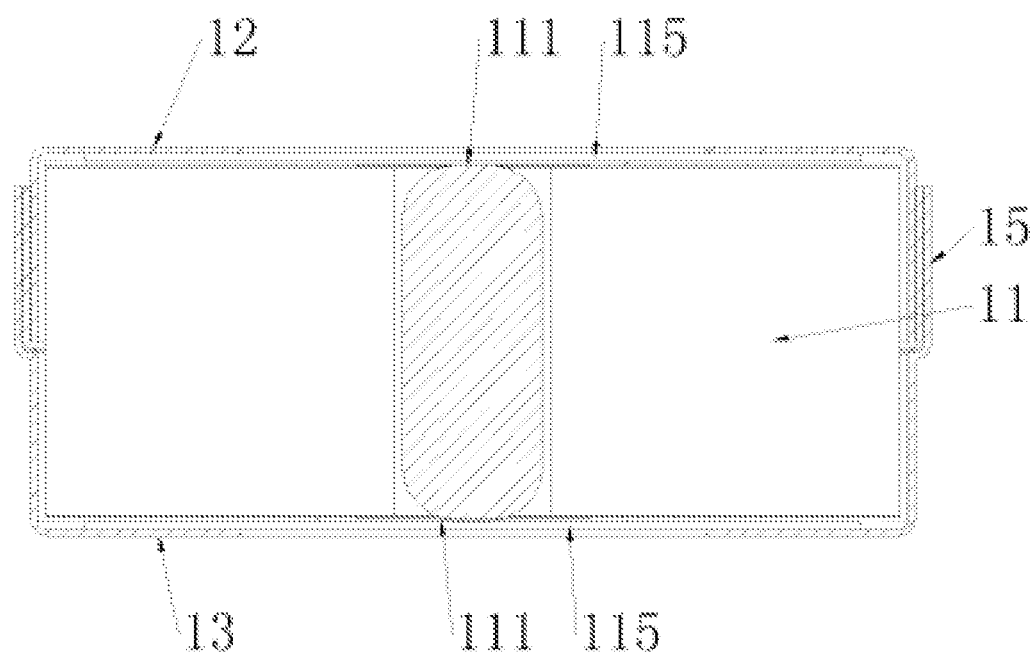
FIG. 4 is a cross-sectional view of a pouch battery according to an embodiment of the present disclosure.

In one example, as shown in FIG. 3, the edge portion 15 forming the sealed connection is folded toward the side wall of the shell. In this way, the shell has a more compact shape and takes up less space. For example, the edge portion 15 has different bending directions. For example, one part of the edge portion 15 is bent upward 15a and the other portion is bent downward 15b, which allows the edge portion 15 to be stressed more evenly.

Of course, the edge portions 15 can also be bent upwards 15a, or can be bent downwards 15b.

Figure 2:
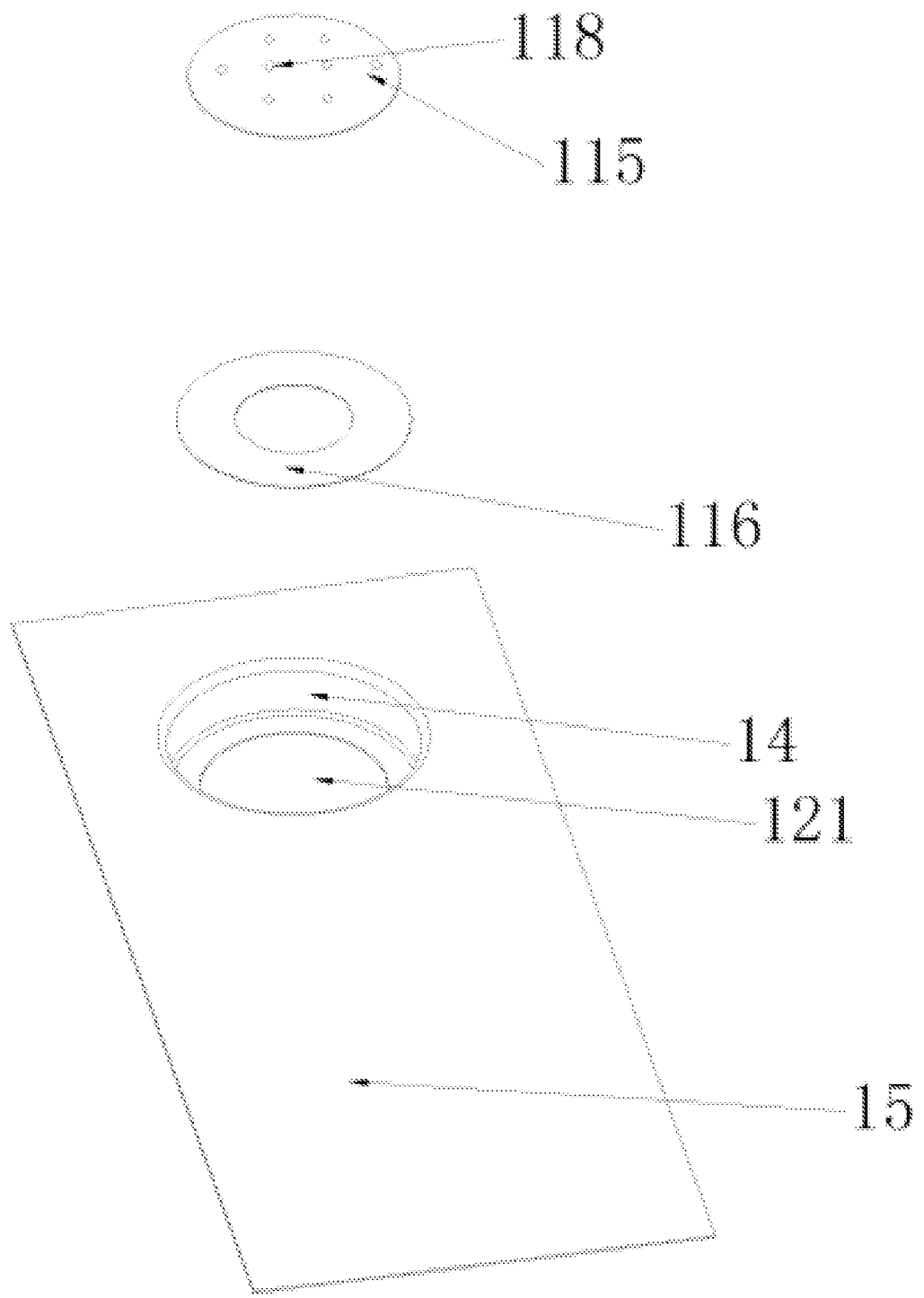
FIG. 2 is an exploded view of a half-shell according to an embodiment of the present disclosure.

In one example, as shown in FIGS. 2 and 3, bumps 118 are provided at a contact position of the terminal 115 and/or the electrical connector. For example, the bumps 118 are provided on the electrical connector and are distributed in a matrix. During vacuumization, the bumps 118 first come into contact with the terminals 115. The terminal 115 forms a pit due to the atmospheric pressure. The bumps 118 cooperate with the pit to effectively prevent the electrical connector from moving relative to the terminal 115.

In addition, when the terminal 115 and the electrical connector are completely pressed together, the bumps 118 can increase the contact area between the two, and the terminal 115 and the electrical connector form spatial contact rather than merely planar contact, improving stability of the electrical connection between the two.

In one example, as shown in FIG. 1, an intermediate metal layer 119 is provided between the electrical connector and the terminal 115.

Between the electrode terminal and the conducting portion, a metal with an atomic number higher than nickel in the periodic table or an alloy of the above-mentioned metals, such as a sheet made of gold, silver, etc., is arranged, and by arranging the intermediate metal layer 119, there is a firmer connection and a more significant conducting effect between the electrode terminal and the conducting portion; or the electrode terminal is a metal having an atomic number higher than nickel in the periodic table or an alloy of the above-mentioned metals, and the type of the metal is as described above. In this example, the tab 111 or the electrode sheet is a metal with an atomic number higher than nickel, which has a small resistance, a small amount of heat generated during charging and discharging, and is safe and reliable; or the electrode terminal is a multi-layer metal composite structure, wherein one of the layers is a metal with an atomic number higher than nickel in the periodic table or an alloy of the above-mentioned metals. For example, the tab 111 or the electrode sheet is a composition of the above-mentioned at least two metal layers. In this way, the electrode terminals have higher electrical conductivity and structural strength; or the electrode terminal is doped with a metal whose atomic number in the periodic table is higher than nickel. This material has good conduction performance.

In one example, as shown in FIG. 1, a heat insulating member 117 is provided between the electrical connector and the energy conversion element. For example, the heat insulating member 117 is an isolation tape. The isolation tape is made of plastic, asbestos and the like. The heat insulating member 117 can prevent heat from being transferred to the bare cell 11 during welding, thereby preventing the bare cell 11 from being damaged by heat.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A manufacturing method of a pouch battery, the manufacturing method comprising:
   forming a cavity in a shell and forming a through hole on the shell;
   forming a terminal in the cavity connected to the through hole in a sealed manner;
   placing an energy conversion element and an electrical connector connected to the energy conversion element into the cavity;
   connecting the electrical connector to the terminal in the cavity by providing a welding pin outside of the shell during welding;
   forming a liquid injection port;
   injecting electrolyte into the cavity via the liquid injection port;
   sealing the liquid injection port by performing a first sealing; and
   activating the electrolyte,
   after activation:
   forming an opening at one side of the shell performing the first sealing,
   vacuumizing the cavity to drain excess electrolyte; and
   performing a second sealing to seal the shell,
   wherein the vacuumizing the cavity further comprises, providing bumps at a contact position of the terminal and/or the electrical connector, and forming pits at the electrical connector and/or the terminal during vacuumization.

2. The manufacturing method of claim 1, wherein the method comprises applying energy outside of the terminal during welding the electrical connector to the terminal.

3. The manufacturing method of claim 1, wherein the method comprises welding the electrical connector to the terminal by a welding spot or welding bead passing through the terminal from outside of the shell; or
   the welding spot or welding bead gradually spreads around from a contact surface between the terminal and the electrical connector.

4. The manufacturing method of claim 1, wherein forming the shell further comprisingcomprises:
   preparing a first half-shell and a second half-shell, at least of the first half-shell and the second half-shell comprising a recessed structure and an edge portions formed as an outward peripheral extension of an edge of the recessed structure;
   providing the terminal on the recessed structure; and
   attaching edge portions of a first half-shell and a second half-shell to form the cavity.

5. The manufacturing method of claim 4, wherein preparing the first half-shell and the second half-shell further comprises:
   preparing the first half-shell and the second half-shell each comprising a recessed structure and an edge portions formed as an outward peripheral extension of an edge of the recessed structure; and
   arranging the recessed structures of the first half-shell and the second half-shell opposite to each other to form the cavity.

6. The manufacturing method of claim 5, wherein forming the liquid injection port further comprises:
   sealing edge portions of three sides of the cavity with a shape of a cuboid; and
   sealing extension portions of two opposite edge portions of a fourth side along their extension directions to form the liquid injection port.

7. The manufacturing method of claim 6, wherein performing the first sealing further comprises sealing a connecting portion between the extension portion and the edge portion.

8. The manufacturing method of claim 4, wherein forming the shell further comprises forming the shell by punch forming.

9. The manufacturing method of claim 4, wherein forming the shell further comprises providing a thermoplastic material at an edge of one surface of the terminal and connecting the thermoplastic material to the shell by heat pressing.

* * * * *